United States Patent Office 2,952,098
Patented Sept. 13, 1960

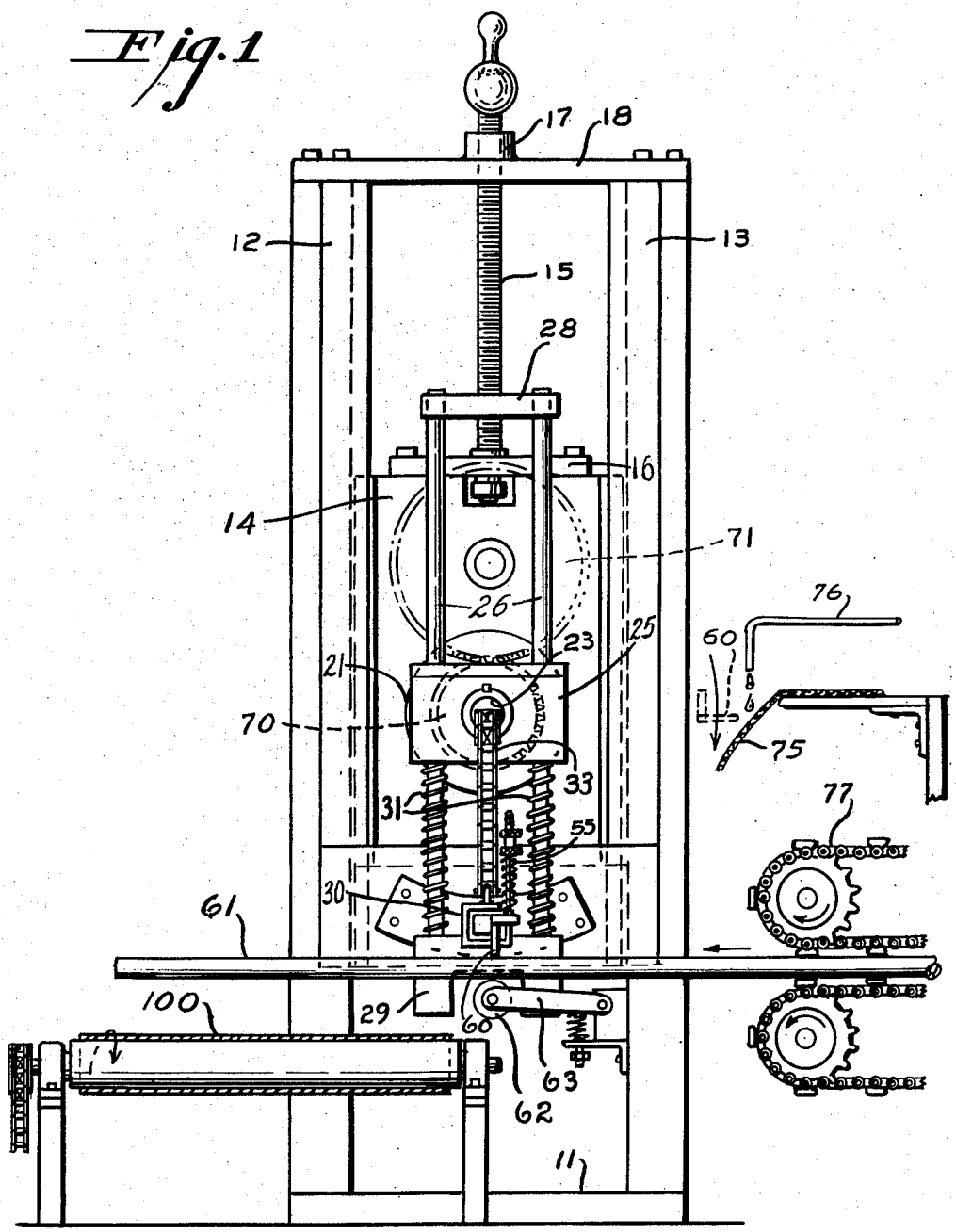

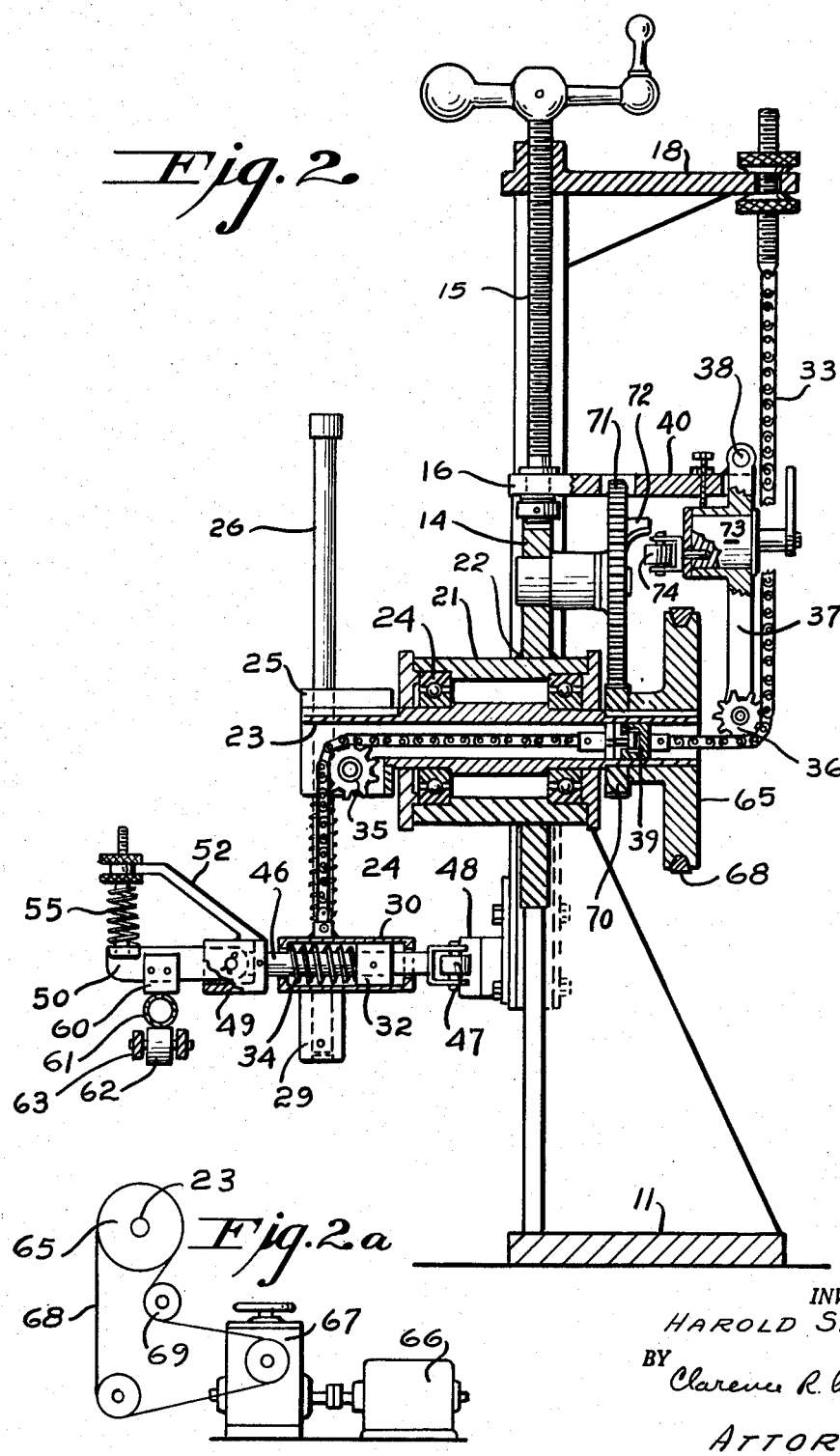

2,952,098

SEVERING APPARATUS

Harold S. Given, Corning, N.Y., assignor to Corning Glass Works, Corning, N.Y., a corporation of New York Filed May 2, 1957, Ser. No. 656,663

9 Claims. (Cl. 49—48)

The present invention relates to apparatus for severing vitreous workpieces such as glass tubing or rod, and more particularly to apparatus adapted for use in association with a machine that draws tubing or rod continuously from a molten supply body, such for example as disclosed in Danner Patent No. 1,218,598 of March 6, 1917. The invention is however primarily concerned with the provision of a severing apparatus that may be readily adjusted, even while in use, to effect severance of workpieces of any of a wide range of lengths from a parent body.

According to the invention the severing member is rotated about an axis extending transverse the line of travel of the parent body at a circumferential speed corresponding to the linear rate of travel of the body and which has a path of travel tangential to the path of travel of the severing member. Abrasion of the body is effected by movement of the severing member transversely thereto. The adjustment of the apparatus in accordance with the lengths of workpieces desired is effected by changing the length of the radius of the severing member to change the length of its circumferential path and readjusting its circumferential speed to agree with the rate of linear travel of the parent body. To adapt the apparatus to effect severance of workpieces of a wide range of lengths without unreasonably increasing the diameter of the circumferential path of the severing member, provision is made to adjust it to skip tangential engagement with the parent body on each alternate revolution when the lengths of workpieces required otherwise exceed the range available to the member in one revolution. It is thus possible, with a given radial setting of the severing member to sever the body into workpieces of a given length for which it is set or into workpieces of double such length.

For a better understanding of the invention reference is made to the accompanying drawings in which: Fig. 1 is a side elevation of an apparatus embodying the invention, showing a work body being fed thereto from a drawing machine, only a portion of the drawing tractor of which is shown.

Fig. 2 is a sectional elevation of the severing apparatus of Fig. 1 and of tubing associated therewith.

Fig. 2a is a schematic drawing of the drive and transmission mechanism.

Referring to the drawings in detail, the severing apparatus is carried by a suitable base 11 provided with spaced upright members 12 and 13. A plate 14 is slidably suspended between members 12 and 13 from a screw 15 freely rotatable in a hanger 16 and threaded through a hub 17 integral with a transverse member 18 bridging the upright members 12 and 13.

A hub 21 passes transversely through plate 14 and is fixed thereto, as by welding, as indicated at 22. A tubular shaft 23 passes through bearings such as 24 in hub 21, and at one end is provided with a severing device carrier assembly embodying a support 25 keyed to shaft 23 and having rods 26 slidably arranged through passages thereof. Rods 26 at one end are bridged by a bar 28 and at the opposite end by a block member 29 to which is secured a housing 30.

Arranged, about rods 26, in the region between block member 29 and support 25, are springs 31 that maintain the block 29 and housing 30 a radial distance from the center of shaft 23 dependent on the height of hub 21 and the length of a chain 33 from one end of which the housing 30 is held against the tension of springs 31. Chain 33 passes about an idler sprocket 35 carried by support 25 and thence through the bore of shaft 23, about an idler sprocket 36 carried on the lower end of a lever 37 pivoted at 38 to a lateral bracket 40 forming a part of the hanger 16, and has its upper end adjustably attached to the transverse member 18. As will be observed, chain 33 contains a swivel 39 within the bore of shaft 23 to permit rotation of that portion of the chain to the left of such coupling with shaft 23. As will be seen the foregoing arrangement is such that as screw 15 is turned in one direction the idler sprocket 36 travels up chain 33 thus elongating the portion thereof between housing 30 and such sprocket, thereby permitting springs 31 to expand and increase the radial distance between the shaft 23 and housing 30. Conversely, if the screw 15 is turned in the reverse direction the length of the left portion of chain 33 will be shortened and will shorten the distance between shaft 23 and housing 30 against the tension of spring 31.

Passing through housing 30 is a slide rod 46 to one end of which is attached a roller 47 adapted to engage a cam 48 for moving slide rod 46 leftward. Within housing 30 is a square guide block 32 pinned to rod 46 to prevent its turning, and a spring 34 adapted to hold the rod 46 to the right whenever the roller 47 is clear of the cam 48. The other end of rod 46 has pinned thereto a slotted sleeve 49 to which is pivoted an arm 50 resiliently held in the position shown, by a spring 55 partly compressed between arm 50 and the free end of a bracket 52. Thus it will be seen that the arrangement is such as to permit an upward swinging movement of extension 50 against the tension of spring 55.

Attached to extension 50 is a severing or scoring member 60 of abrasive material adapted to intimately engage the parent supply body 61 under the pressure of spring 55 and while member 60 is being moved transversely of such body by means of cam 48. As will be observed, the body 61 is in the meantime supported in the region immediately below member 60 by a wheel 62 carried by a spring supported arm 63. The circumferential speed of member 60 is always adjusted to agree with the linear rate of travel of body 61, as will be brought out hereafter. The radius of the arc of travel of member 60 is obviously dependent on its distance from the tubular shaft 23 as determined by screw 15 and obviously determines the frequency of the engagement of member 60 with the body 61, and hence the lengths of the workpieces.

As diagrammatically illustrated in Fig. 2a, the shaft 23 is rotated by pulley 65 driven by a motor 66 through the medium of a variable speed transmission 67 and a belt 68. A suitable idler pulley 69 serves to maintain the belt 68 taut irrespective of the position of pulley 65. As will be understood, the transmission 67 comprises the facility for adjusting the circumferential speed of the member 60 to agree with the linear speed of the body 61.

Also keyed to shaft 23 is a gear 70 in mesh with a gear 71 of twice the diameter of gear 70 and accordingly rotated one revolution for every two revolutions of the shaft 23. Gear 71 is provided with a cam 72 adapted to swing the lever 37 to the right when an eccentrically mounted shaft 73 passing through lever 37 is turned 180° to bring its roller 74 in the path of such cam. Since gear 71 is twice the diameter of gear 70, the cam 72 is at such times effective to actuate the lever 37 to shorten the effective length of chain 33 each alternate revolution of shaft 23. Such operation is arranged to occur during the time that the severing member 60 would otherwise engage the body 61 and prevents such engagement during each alternate revolution of shaft 23.

Actual fracture of a workpiece from the body 61 may result solely from its abrasion and its lack of support beyond the roller 62. Since, however, ordinarily the body 61 is still hot as it issues from a drawing tractor 77 and at the time of abrasion, it is preferable to positively assure its fracture, during or immediately following abrasion, by imparting a thermal shock thereto at the time of abrading it. This is accomplished by arranging a wick 75 in the path of travel of member 60, a feeding water to such wick from a pipe 76 so that the member 60 is wet and imparts a thermal shock to the body 60 as it engages it. As the workpieces break away from the parent body 61 they may be conveniently intercepted and carried away, as on a suitable conveyor such as 100.

As will be understood, in use of the invention changes in lengths of workpieces attained can be made while severing operations are in progress by simply moving the roller 74 to its alternative position and/or by turning screw 15 and readjusting the circumferential speed of member 60 by means of transmission 67.

What is claimed is:

1. In an apparatus for severing workpieces from a linear body of vitreous tubing or rod traveling along a longitudinal path at a uniform speed, a shaft arranged with its axis normal to said path, a support for said shaft movable toward and away from such path, an arm rotatable with said shaft arranged transversely thereof and movable endwise transversely thereto, an abrasive device attached to one end of said arm tangentially engageable with a body traveling along such path during the rotation of said shaft, means for moving said support to change the distance between said shaft and such path, means for concurrently moving said arm transversely of the shaft to modify the effective length of said arm as required to maintain said abrasive device available for tangential engagement with such body during a subsequent rotation of said shaft, means for rotating said shaft, and means for moving said device transversely across the body during its engagement therewith.

2. An apparatus such as defined by claim 1 which includes means for moving said arm to shorten its effective length on each alternate revolution of said shaft to prevent the tangential engaging relationship being effect on each alternate revolution of the shaft whereby the spacing between respective abrasions along the body is doubled.

3. An apparatus such as defined by claim 1 which includes means for readjusting the circumferential speed of the shaft to make the peripheral speed of the body-engaging surface of the device correspond to the linear speed of travel of the body.

4. An apparatus such as defined by claim 1 wherein the shaft is tubular and the means for moving the arm transversely of the shaft includes a flexible support therefor extending through the bore of such shaft.

5. An apparatus such as defined by claim 4 wherein the means for modifying the length of the arm includes a resilient member constantly tending to move such arm in a direction to position said device a greater distance from such shaft.

6. An apparatus such as defined by claim 5 wherein means is provided for modifying the length of that portion of the flexible support extending between the abrasive device and such shaft.

7. An apparatus such as defined by claim 6 wherein said means includes a cam rotatable by the means for rotating said shaft.

8. An apparatus such as defined by claim 7 wherein means is provided for preventing the rotation of such cam from so modifying the effective length of the specified portion of the flexible support.

9. In an apparatus for severing workpieces from a linear body of vitreous tubing or rod traveling along a longitudinal path at a uniform speed, a tubular shaft having its axis normal to the workpiece path, a shaft support movable in directions normal to such path, a severing member carrier support arranged on said shaft, a rod slidably extending through a passage in said carrier support normal to the axis of said shaft, a severing member carried on one end of said rod tangentially engageable with the workpiece by rotation of said shaft, a spring about such rod between said member and carrier support tensioned to tend to slide such rod in a direction to increase the effective length of said rod, a chain passing through the bore of said shaft and to one end of which said member and rod are anchored, the other end of such chain being anchored to said shaft support whereby movement of such support effects a corresponding radial movement of the member with respect to said shaft and means for rotating said shaft to periodically bring said member into tangential engagement with a workpiece traveling along such path irrespective of the effective radius of said rod.

References Cited in the file of this patent

UNITED STATES PATENTS

| | | |
|---|---|---|
| 1,220,201 | Danner | Mar. 27, 1917 |
| 1,585,896 | Danner | May 25, 1926 |
| 1,990,375 | Hahn | Feb. 5, 1935 |
| 2,157,067 | Brown et al. | May 2, 1939 |
| 2,332,013 | Rudert et al. | Oct. 19, 1943 |
| 2,447,962 | Schwalbe | Aug. 24, 1948 |